United States Patent [19]

Kurihara et al.

[11] Patent Number: 4,943,975
[45] Date of Patent: Jul. 24, 1990

[54] SPREAD SPECTRUM COMMUNICATION RECEIVER

[75] Inventors: Takao Kurihara; Masahiro Hamatsu; Masaharu Mori, all of Tokyo, Japan

[73] Assignee: Clarion Co., Ltd., Tokyo, Japan

[21] Appl. No.: 256,394

[22] Filed: Oct. 7, 1988

[30] Foreign Application Priority Data

| Oct. 9, 1987 | [JP] | Japan | 62-255693 |
| Oct. 9, 1987 | [JP] | Japan | 62-255694 |
| Oct. 9, 1987 | [JP] | Japan | 62-255695 |
| Oct. 30, 1987 | [JP] | Japan | 62-275073 |
| Nov. 11, 1987 | [JP] | Japan | 62-283056 |
| Nov. 11, 1987 | [JP] | Japan | 62-283055 |

[51] Int. Cl.$^5$ .............................. H04K 1/04
[52] U.S. Cl. ....................................... 375/1
[58] Field of Search ..................... 375/1; 380/34

[56] References Cited

U.S. PATENT DOCUMENTS

| 4,423,517 | 12/1983 | Danno et al. | 375/1 |
| 4,538,280 | 8/1985 | Mosley, Jr. et al. | 375/1 |
| 4,550,414 | 10/1985 | Guinon et al. | 375/1 |
| 4,653,069 | 5/1987 | Roeder et al. | 375/1 |
| 4,761,796 | 8/1988 | Dunn et al. | 375/1 |

Primary Examiner—Salvatore Cangialosi
Attorney, Agent, or Firm—Flynn, Thiel, Boutell & Tanis

[57] ABSTRACT

A spread spectrum communication receiver is disclosed, which is provided with a correlator for correlating a received PN code contained in a received signal with a reference PN code contained in a reference signal generated on the receiver side, the output of which is given to pattern judgment means such as a matched filter, etc., and an operation of the initial synchronization of the two PN codes in the correlator is effected by using a judgment output obtained when the pattern of the output of the correlator is in accordance with a predetermined judgment pattern.

11 Claims, 9 Drawing Sheets

SPREAD SPECTRUM COMMUNICATION RECEIVER

FIELD OF THE INVENTION

This invention relates lo a spread spectrum communication receiver and in particular to the improvement for stabilizing the operation and increasing the precision of a spread spectrum communication receiver of type, by which received signals are demodulated to obtain data by using the output of a correlator, which correlates a pseudo noise code (hereinbelow abbreviated to PN code) contained in the received signals with a reference PN code.

BACKGROUND OF THE INVENTION

In the spread spectrum communication, as indicated in FIG. 9(a), the PN code, which is one of binary codes, is modulated with data and the carrier, which is modulated with the PN code thus modulated, is transmitted. In the figure, reference numeral 31 represents data; 32 is a modulator: 33 is a PN code generator; 34 is a carrier generator; 35 is a modulator; and 36 is an antenna. On the receiver side, as indicated in FIG. 9(b), the signals are received and correlated with a PN code serving as the reference. Self correlation waveform (in this specification, hereinbelow, called correlation spike waveform) having a relatively large amplitude appearing when the two codes are in accordance with each other or in the neighborhood thereof is treated to restore the data. In the figure, reference numeral 37 is an antenna; 38 is a correlator: 39 is a reference PN code generator; 40 is a data demodulator; and 41 represents data.

There is known a convolver as one of matched filters. A convolver is a functional element performing convolution integral and it serves as a matched filter performing a correlation operation, if the binary code serving as the reference (in this specification, hereinbelow, called reference code) is in the time inverted relation with respect to the received code.

There are known SAW convolvers as an example of convolvers. From the point of view of the construction there are convolvers, (1) in which an air gap is disposed between a piezo-electric body and a silicon layer, (2) in which a piezo-electric body and a silicon layer are formed in one body through an oxide layer, (3) which is composed only of a Piezo electric body, etc. All of these execute multiplication operation by interaction of the two signals, utilizing nonlinear characteristics and integrate the result of the interaction in an electrode called gate disposed in the interaction area.

FIG. 10 shows an example of the construction of the SAW convolver, in which reference numerals 42 and 43 are transducers; 44 is a piezo-electric body; 45 is an oxide film; 46 is a silicon substrate; and 47 is a gate electrode. The signal s(t) inputted through the transducer 42 propagates toward the right in the figure and the signal r(t) inputted through the transducer 43 propagates toward the left. The interaction between s(t) and r(t) is produced owing to the non-linear characteristics of the piezo-electric body—oxide film —silicon structure and the integral operation is executed and the result of the interaction is integrated by the gate electrode 47.

The signal c(t) outputted by the gate electrode 47 can be represented by the following equation;

$$c(t) = A \int_{t-T}^{t} r(t - x/v)s(t - T + x/v) \, dx/v$$

where A is a constant; T represents the time necessary for acoustic wave to pass under the gate electrode (in this specification, hereinbelow, called in-gate delay time); x the distance measured in the direction of the propagation of s(t); and v the sound velocity.

In general the PN code has a determined period. In the waveform produced on the transmitter side it is often so constructed that there exists a certain relation between one period of the PN code and the length of one bit in the data. Here, in order to make explanation easier, as an example, it is supposed that the one period of the PN code and the length of one bit in the data are equal to each other.

On the other hand the relation between the in-gate delay time and the PN code can be also suitably selected. That is, the in-gate delay time can be either shorter than, equal to, or longer than the one period of the PN code. The in-gate delay time means an integral domain in the correlation operation. Taking the correlation characteristics of the PN code into account, it is desirable that the integral domain extends exactly over one period. Therefore, in this explanation, as an example, it is supposed that the in-gate delay time and the one period of the PN code are equal to each other.

The relations described above are shown in FIGS. 11(a), 11(b) and 11(c). FIGS. 11(a) and 11(b) represent the arrangement of the data and the PN code, respectively. In the above example the length of the one data bit and one period of the PN code are identical and both of them are equal to l. FIG. 11(c) is a schematical cross-sectional view of the convolver and the delay time within tho length L of the gate electrode is equal to l. The above description is an example for explaining this invention and the relations among the length of one data bit, one period of the PN code and the in-gate delay time can be arbitrarily selected.

For the real communication, since when transmitted signals are received is unknown on the receiver side, it waits for the reception of tho signals, while inputting the reference signal to one of the transducers. When a signal is received, it is supplied to the convolver through the other transducer. When the PN codes contained in the received signal and the reference signal, respectively, are in accordance to each other, the correlation spike waveform is obtained through the gate electrode of the convolver. However it is not known at all at which position they are in accordance. If the position where the two codes are in accordance were not correctly set, the data could not be restored correctly. For example, in the case where the two codes are in accordance in the form indicated in FIG. 12(a), on tho first half of the received code a data bit A takes place and on the second half another data bit B takes place. The figure shows the arrangement of the data bits, the received PN code and the reference PN code, the region indicated by L representing the interaction region under the gate electrode. The PN code A represents the time inverted code of the PN code A.

As explained above, some measures should be taken so that the received code and the reference code are in accordance finally at the position indicated in FIG. 12(b), wherever they are in accordance at first. Here the period from the moment, where the signal is received, to the moment, where the codes are in accordance with each other at the position indicated in FIG. 12(b), is called initial synchronization.

In the case where there exists a difference between the clock frequency of the received PN code and the clock frequency of the reference code, after the initial synchronization has been effected and the codes have been positioned, as indicated in FIG. 12(b), the position where they are in accordance with each other is shifted gradually from the arrangement indicated in FIG. 12(b). This shift can be represented, every time the beginning of the received PN code and that of the reference PN code encounter, by;

$$\frac{\nu N}{2 f_r} \left| 1 - \frac{f_r}{f_t} \right| [m],$$

where $f_r$ represents the clock frequency of the reference PN code; $f_t$ the clock frequency of the received PN code; and N the number of chips constituting one period of the PN code.

That is, even if the initial synchronization is effected, when the clock frequencies of the codes are different the position where the two codes are in accordance with each other, is shifted gradually from the correct position and the demodulation to obtain the data becomes impossible. This means that a completely identical clock frequency should be used on the transmitter side and the receiver side. For a clock oscillator a quartz oscillator is usually used as the reference. Therefore this method has drawbacks that not only it is extremely difficult to fabricate plural quartz crystals having a completely same frequency, but also circumstances such as temperature, humidity, etc. should be controlled with an extremely high precision.

In order to remove the drawbacks described above, a method is proposed e.g. in Japanese Patent Application No. 59-77789, by which the initial synchronization described above is effected by generating a pulse (hereinbelow called correlation pulse) by signal-processing the correlation spike described above and by making the patterns corresponding to one period of the two PN codes be in accordance with each other by initializing (resetting) the reference PN code while using the correlation pulse stated above.

SUMMARY OF THE INVENTION

However even by such a method there is a problem that the probability that erroneous operations due to noises, etc. take place is high.

Consequently a first object of this invention is to provide a spread spectrum communication receiver capable of effecting always a stable initial synchronization in the correlator without any erroneous operations due to noises.

In order to achieve the above first object of this invention, a first spread spectrum communication receiver according to this invention, in which desired information is obtained by demodulating received signals by means of a correlator correlating a received PN code contained in the received signals and a reference PN code contained in a reference signal generated on the receiver side, is characterized in that the output of the correlator is inputted in pattern judgment means and the position, where the two codes are in accordance with each other in the correlator, is set correctly by controlling the phase of the reference PN code by using the output obtained when the inputted pattern is in accordance with a predetermined judgment pattern.

In this way a correlation pulse corresponding to the polarity of a correlation spike outputted by the correlator s generated, which pulse is given to a matched filter serving as the pattern judgment means, and the initial synchronization of the two codes in the correlator is effected by using the output of the matched filter obtained when the pattern of the pulse given to the matched filter is in accordance with the predetermined judgment pattern, e.g. the weight in the matched filter.

Secondly, even by the prior art method described previously no attention is paid to the synchronization of the two codes depending on the amount of delay necessary for the signal processing at the generation of the correlation pulse measured from the correlation spike and therefore there is a problem for effecting a correct initial synchronization.

Consequently a second object of this invention is to provide a spread spectrum communication receiver capable of effecting always a stable initial synchronization in the correlator by establishing a method for setting the amount of delay stated above and the setting position and effecting a synchronization of the two codes depending on the amount of delay thus obtained.

In order to achieve the above second object of this invention, a second spread spectrum communication receiver according to this invention described previously is characterized in that it comprises reversible counting means, which begins the forward counting with the timing of the front bit of the reference PN code and is switched to the backward counting by the correlation pulse generated from tho correlation spike outputted by the correlator and it is so constructed that the synchronization of the received PN code and the reference PN code in the correlator is effected by controlling it so that tho input to the correlator is started from tho front bit of the reference PN code, when the counting value of the counting means has reached a predetermined value, an offset valve being set, depending on the amount of delay at the generation of the correlation pulse by signal-processing the correlation spike.

Owing to the construction described above, always a stable initial synchronization is effected, because an offset value corresponding to tho amount of delay necessary for the signal processing at the generation of the correlation pulse from the correlation spike is set in the reversible counting means included in the two-code synchronizing means in the correlator.

Thirdly, according to the prior art method described previously it is necessary to correct errors in the phase between the patterns of the two codes due to the difference between the code clock frequencies of the two codes, after the initial synchronization has been effected according to the prior art method, i.e. to hold the synchronization, and this holding of the synchronization is effected by extracting the correlation pulse obtained, every time the two codes are in accordance with each other in the correlator by using a gate pulse with a desired timing so as to initialize the reference PN code.

However, according to such a prior art method there are problems that the probability that erroneous operations take place is high, when noises, etc. are mixed with the timing of the gate pulse, and that a long time is necessary for converging the errors, because the errors in the phase are reduced to $\frac{1}{2}$, every time the two cOdes are in accordance with each other and the initial synchronization of the reference PN code is effected. Furthermore there is thus another problem that it is not possible to effect correctly the data demodulation.

Consequently a third object of this invention is to provide a spread spectrum communication receiver capable of effecting a stable operation by improving the method for holding the synchronization stated above and a fourth object of this invention is to provide a spread spectrum communication receiver capable of effecting correctly the data demodulation.

In order to achieve the above third object of this invention, a third spread spectrum communication receiver according to this invention described previously is characterized in that it comprises means for generating sampling signals before and after the correlation pulse outputted by the correlator in time, means for extracting the correlation pulse stated above by these sampling pulses, means for counting the number of extractions, means for generating a phase controlling signal when the difference between these count values has reached a predetermined Value to effect the phase control of the reference PN code, the output of the correlator being inputted in pattern judging means so that the phase of the reference PN code is controlled by the output obtained when the outputted pattern is in accordance with a predetermined judgment pattern.

The amount and the direction of deviation of the correlation pulse are detected by counting the extractions of the correlation pulse by means of the sampling pulses. The phase of the reference PN code is controlled, depending on this detected amount and the errors in the phase between the two codes are corrected so as to hold tho synchronization.

In order to achieve the above fourth object of this invention, a fourth spread spectrum communication receiver according to this invention described previously is characterized in that it comprises means for generating sampling signals before and after the correlation pulse outputted by the correlator in time, means for extracting the correlation pulse stated above by these sampling pulses, means for counting the number of extractions, means for generating a phase controlling signal when the difference between these count values has reached a predetermined value to effect the phase control of the reference PN code, and means for demodulating the received signal to obtain the data by extracting the correlation pulse between the two sampling pulses.

The amount and the direction of deviation of the correlation pulse are detected by counting the extractions of the correlation pulse by means of the sampling pulses. The phase of the reference PN code is controlled, depending on this detected amount, and the errors in the phase between the two codes are corrected so as to hold the synchronization, and at the same time the received signal can be demodulated so as to obtain the data by extracting the correlation pulse between the two sampling pulses.

Fourthly, according to the prior art method described above for holding the synchronization no method for detecting the start timing of information data contained in the data obtained by the demodulation is established, which is a problematical point. Consequently a fifth object of this invention is to provide a spread spectrum communication receiver capable of detecting easily the start timing of the information data contained in the data obtained by the demodulation by means of an external circuit.

In order to achieve the above fifth object of this invention, a fifth spread spectrum communication receiver according to this invention, in which desired information is obtained by demodulating received signals by means of a correlator correlating a received PN code contained in the received signals and a reference PN code contained in a reference signal generated on the receiver side, is characterized in that it is so constructed that the data obtained by the demodulation is inputted in an information data start timing judgment means and the output obtained when the pattern thereof is in accordance with a predetermined judgment pattern is given to an external circuit so as to detect the start timing of the information data.

The start timing judgment means consists of e.g. a matched filter, in which the data obtained by the demodulation is inputted, and when the pattern thereof is in accordance with the predetermined judgment pattern, a pulse is outputted. By using this pulse it is possible to know easily the start timing of the data information.

Fifthly, according to the prior art method described above for holding the synchronization the probability that erroneous operations of tho initial synchronization due to noises, etc. take place is high and further no method for detecting the start timing of the data information contained in the data obtained by the demodulation is established, which was a problem for practical use.

Consequently a sixth object of this invention is to provide a spread spectrum communication receiver capable of stabilizing the initial synchronization operation and making the detection of the start timing of the information data contained in the data obtained by the demodulation easy and precise.

In order to achieve the above sixth object of this invention, a sixth spread spectrum communication receiver according to this invention, in which desired information is obtained by demodulating received signals by means of a correlator correlating a received PN code contained in the received signals and a reference PN code contained in a reference signal generated on the receiver side, is characterized in that it is so constructed that the output of the correlator is inputted in first pattern judgment means, the initial synchronization of the two codes in the correlator is effected by the output obtained when the inputted pattern is in accordance with a pattern, in which all the bits are "1" or "0"; at the same time the data obtained by the demodulation is inputted in second pattern judgment means; and the start timing of the data information contained in the data obtained by the demodulation is detected by means of the output obtained when the pattern inputted therein is in accordance with a predetermined pattern consisting of BARKER codes or phase inverted codes thereof.

In this way the position, where the two PN codes are in accordance with each other in the correlator by controlling the phase of the reference PN code by means of the output of the first pattern judgment means and the output of the second pattern judgment means is given to an external circuit in order to make it detect the start timing of the data obtained by the demodulation.

DETAILED DESCRIPTION

Figure 1:
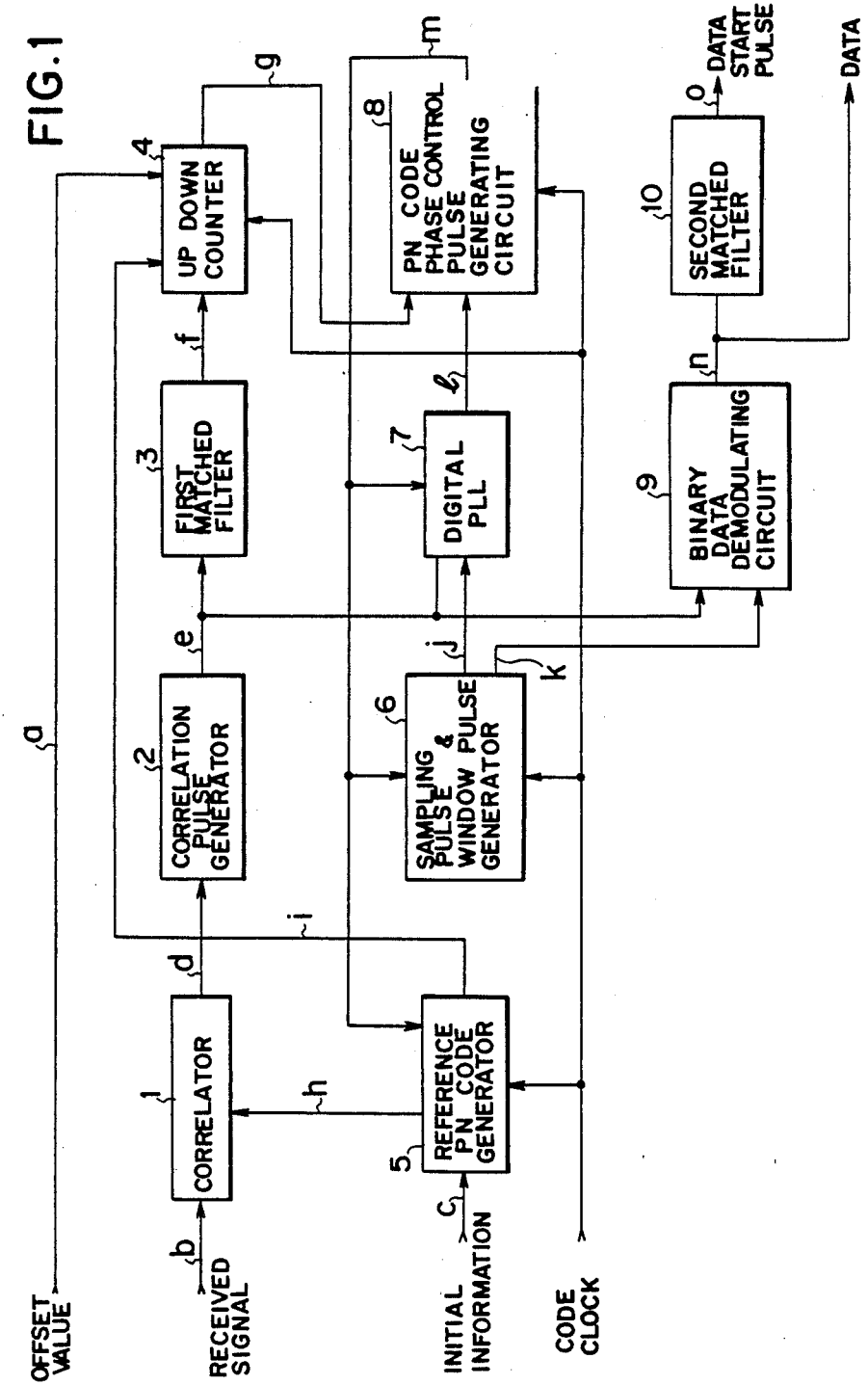
FIG. 1 is a block diagram illustrating an embodiment of this invention.

Hereinbelow this invention will be explained, referring to preferred embodiments indicated in the drawings. FIG. 1 is a block diagram indicating the construction of a spread spectrum communication receiver, which is an embodiment of this invention. In which reference numeral 1 is a correlator; 2 is a correlation pulse generator; 3 is a first matched filter; 4 is an up-down counter; 5 is a reference PN code generator; 6 is a sampling pulse and window pulse generator; 7 is a digital phase lock loop circuit; 8 is a PN code phase control pulse generating circuit; 9 is a binary data demodulation circuit; and 10 is a second matched filter.

In FIG. 1, the correlation pulse generator 2 generates a correlation pulse (e) obtained by separating correlation spikes (d) appearing when a received PN code is in accordance with a reference PN code (h) in the correlator 1 or in the neighborhood thereof into positive and negative ones, depending on their polarity. The first matched filter 3 outputs a pulse (f) (initial synchronization detection signal), when the pattern of the correlation pulse (e) outputted by the correlation pulse generator 2 is in accordance with a predetermined judgment pattern.

The up-down counter 4 is initialized by a strobe pulse (i) outputted by the reference PN code generator 8 and up-counts, starting from an offset value (a) set by an external circuit such as a microprocessor, etc. However, when a pulse (f) is outputted by the first matched filter 3, triggered by the pulse (f), it begins to down-count and generates a borrow pulse (g).

The reference PN code generator 5 outputs the reference PN code (h) and the strobe pulse (i) indicating the front bit thereof on the basis of initial information (c) of the reference PN code set by the external circuit.

The sampling pulse and window pulse generator 8 outputs sampling pulses (j), which sample and extract a correlation pulse (e) outputted by the correlation pulse generator 2, and a window pulse (k). The digital phase lock loop circuit 7 holds the synchronization between the received PN code contained in the received signal (b) inputted in the correlator 1 and the reference PN code (h) contained in the reference signal.

The PN code phase control pulse generating circuit is triggered by pulses (g) and (l) outputted by the up-down counter 4 and the digital phase lock loop circuit 7 and outputs a phase control pulse (m) for the reference PN code (h). The binary data demodulation circuit 9 demodulates the inputted signal to obtain binary data by the correlation pulse (e) outputted by the correlation pulse generator 2 and the window pulse (k) outputted by the sampling pulse and window pulse generator 6. The second matched filter 10 outputs (o), when the binary data (n) outputted by the binary data demodulation circuit 9 is in accordance with the predetermined pattern.

The circuit described above are triggered by respective pulses for starting the reception operation outputted by the external circuit not shown figure to start respective operations.

Now the operation of tho embodiment of this invention described above will be explained more in detail. In order to facilitate the explanation, it is supposed here as an example that one period of the PN code and the length of a data bit as well as the integration domain in the correlator 1 and one period of the PN code are in accordance with each other.

Figure 2:
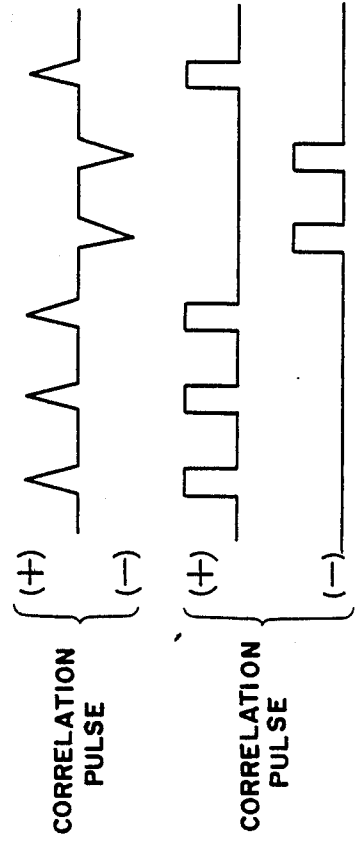
FIG. 2 is a timing chart for explaining the operation of a correlation pulse generator in the embodiment indicated in FIG. 1.
Figure 3:
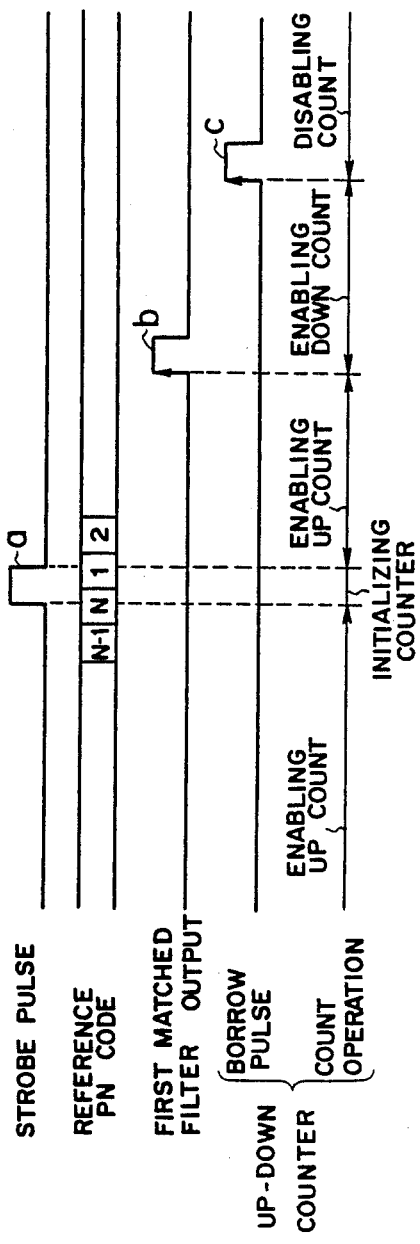
FIG. 3 is a timing chart for explaining the initial synchronization operation in the embodiment indicated in FIG. 1.

When a pulse for starting the reception operation is outputted by the external circuit, the reference PN code generator 5 gives the correlator 1 the reference PN code (h) contained in the reference signal on the basis of the initial information (c) of the PN code set by tho external circuit. When a spread spectrum communication signal is received and the received PN code contained in the received signal (b) is in accordance with the reference PN code (h), a reference spike (d) is outputted from the correlator 1 to the correlation pulse generator 2. The correlation pulse generator 2 separates correlation spikes (d) into positive and negative ones and generates a correlation pulse (e), as indicated in FIG. 2, which pulse is given to the first matched filter 3, the digital phase look loop circuit 7 and the binary data demodulation circuit 9.

Figure 12A:
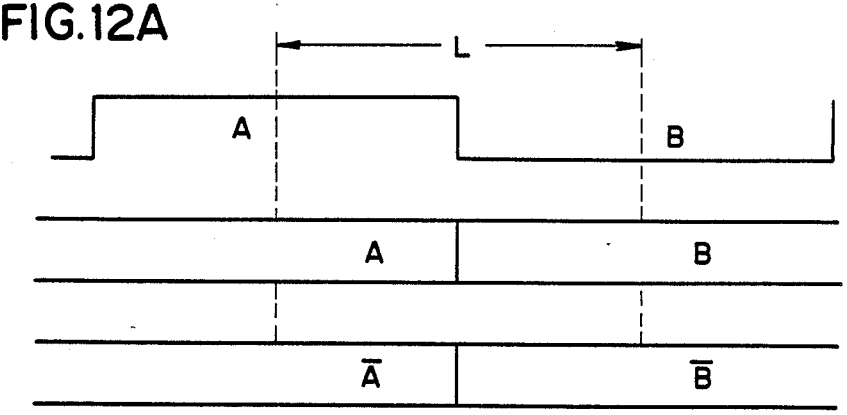
FIGS. 12(a) and 12(b) are schemes for explaining that the received PN code and tho reference PN code should be correctly arranged.
Figure 12B:
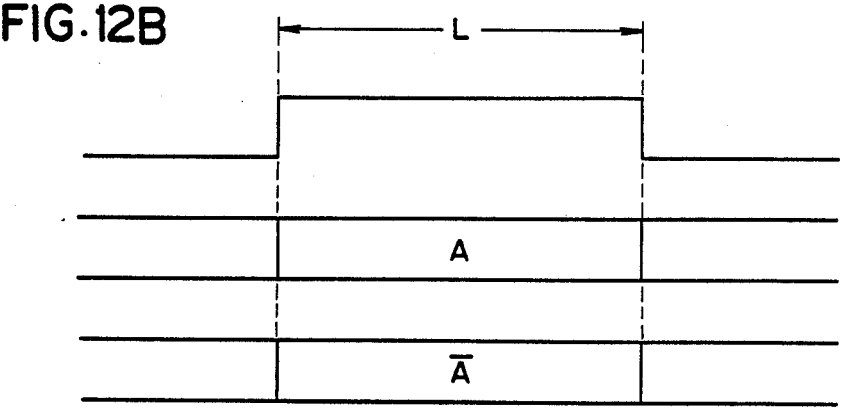

However, as stated previously it is unknown at what position tho two PN codes are in accordance with each other in the correlator 1 and since received data cannot be demodulated correctly, unless the position where the two codes are in accordance with each other is set correctly, the initial synchronization should be affected so that they are in accordance finally at the position as indicated in FIG. 12(b). According to this invention this initial synchronization operation is effected as follows.

Transmitted data consist of preamble data and information data, as indicated in FIG. 13(a). Further the preamble data include an initial synchronization pattern and an information data start timing detection pattern, as indicated in FIG. 13(b), and the correlation pulse (e) outputted by the correlation pulse generator 2 is inputted in the first matched filter 3. The first matched filter 3 outputs a pulse (f) to the up-down counter 4, when the pattern of the correlation pulse (e) is in accordance with the set predetermined pattern.

The up-down counter 4 is initialized by the strobe pulse (i) indicating the front bit of the reference PN code (h) outputted by the reference PN code generator 5 and repeats the up-count, starting from the offset value (a) set by the external circuit, until the pulse (f) is outputted by the first matched filter 3. When the pulse (f) is outputted by the first matched filter 3, the up-down counter 4 is switched from the up-count to the down-count with the timing of the pulse and when the count value of the counter 4 is "0", outputs a borrow pulse (g) to the PN code phase control pulse generating circuit 8.

The PN code phase control pulse generating circuit 8 is triggered by the borrow pulse (g) stated above and outputs a phase control pulse (m) for the reference PN code (h) to the reference PN code generator 5, the sampling pulse and window pulse generator 6 and the digital phase lock loop circuit 7.

By a series of the operations described above the received PN code and the reference PN code (h) are set finally so as to be in accordance with each other.

Figure 4:
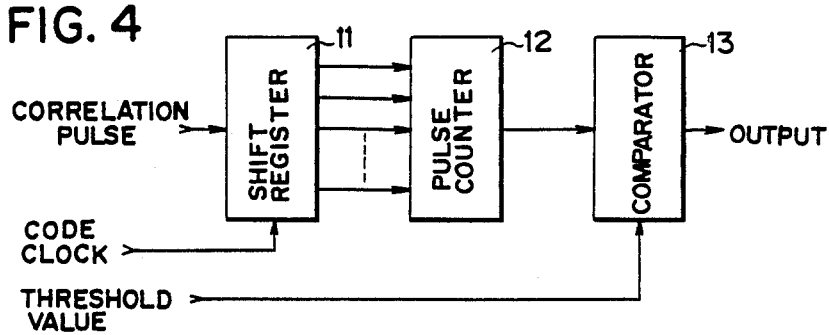
FIGS. 4, 5 and 6 are block diagrams illustrating an example of the construction of a first matched filter in the embodiment indicated in FIG. 1.
Figure 5:
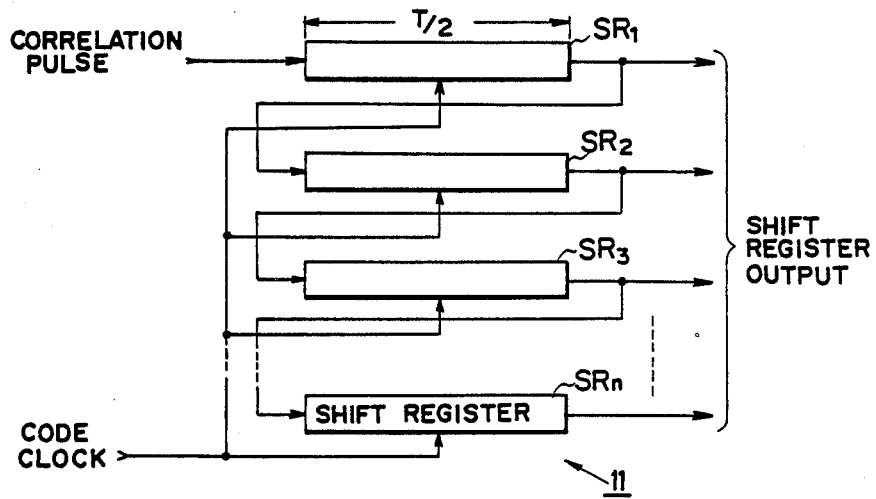
Figure 6:
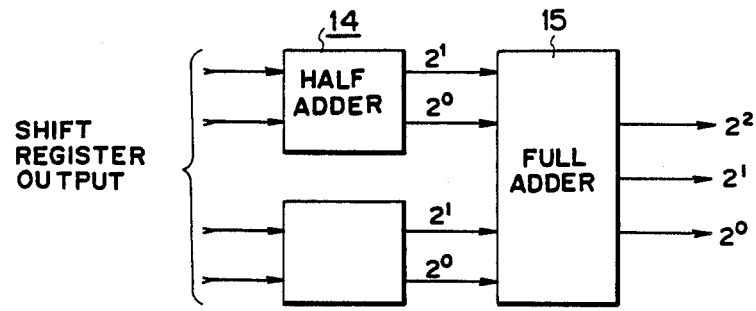

FIGS. 4, 5 and 6 show an example of the construction of the first matched filter 3.

In FIG. 4, reference numeral 11 is a shift register; 12 is a pulse counter and 13 is a comparator.

The shift register 11 consists of a plurality of shift registers $SR_1 \sim SR_2$ connected in series with each other, as indicated in FIG. 5, each of which is driven by a code clock. There are disposed an output terminal for every predetermined length and the output of every output terminal is given to the pulse counter 12.

The pulse counter 12 counts the total number of pulses outputted in parallel by the shift registers and converts the count into binary data, which are outputted to the comparator 13. This pulse counter 12 consists of e.g. a plurality of half adders 14 and a full adder 15, as indicated in FIG. 6.

The parallel outputs of a pair of the shift registers are inputted in a half adder 14, where a half addition is effected. As the result the input is converted into binary data by assigning the addition output to the order of $2^0$ and the carry output to the order of $2^1$.

Furthermore the outputs thus converted into binary data are inputted in the full adder 15, where they are added to each other. In this way the total number of the pulses outputted in parallel is converted into binary data.

The comparator 13 compares the binary data outputted by the pulse counter 12 with a threshold value set by the external circuit and outputs a pulse, when the binary data have reached the threshold value.

In the first matched filter 3 constructed as described above, e.g. in the case where all the elements of the pattern of the transmitted data for the initial synchronization are "1", a correlation pulse is generated even for the case indicated in FIG. 12(a). That is, the positive side correlation spike is produced in a period, which is ½ of the period of time T (hereinbelow called delay time) corresponding to the integral domain of the correlator 1 and no negative side correlation spike is produced. Consequently, while positive side correlation spikes are generated by the correlation pulse generator with the same period as the correlation spikes, no negative side correlation pulses are produced.

This correlation pulse is inputted in the shift register 11 and in this shift register 11 there is disposed an output terminal for every ½ of the delay time T, as indicated in FIG. 5. Consequently, if the signal is received normally, the number of pulses outputted in parallel is increased by 1 for every ½ of the delay time T and is converted into binary data by the pulse counter 12, as described previously. After that, when the binary data has reached the threshold value, the comparator 13 outputs a pulse.

According to the construction stated above of the first matched filter 3, even if abnormality due to noises, etc, is produced in the output of the correlator 1, it is possible to effect matching with only normal correlation pulses.

Furthermore the interval of the output terminals set for the plurality of shift registers $SR_1 \sim SR_2$ constituting the shift register 11 can be modified, depending on the pattern of the transmitted data for the initial synchronization.

Figure 7:
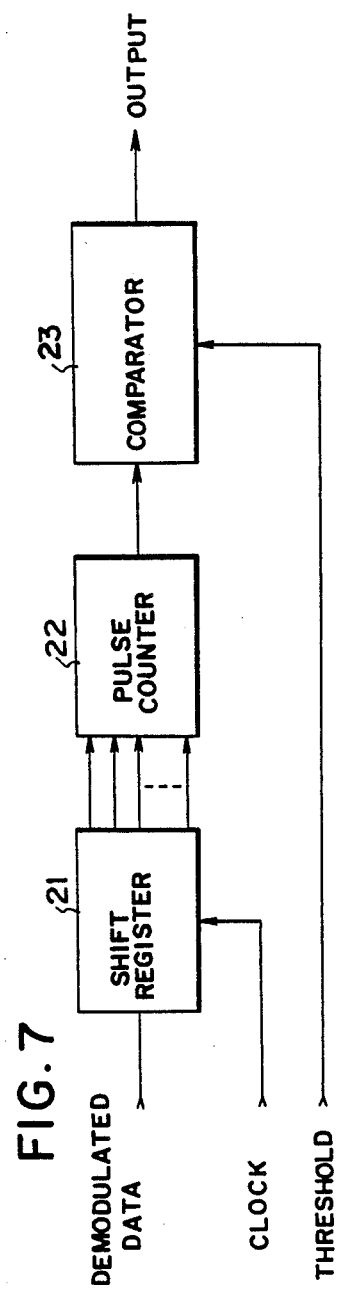
FIGS. 7 and 8 are block diagrams illustrating an example of the construction of a second matched filter in the embodiment indicated in FIG. 1.
Figure 8:
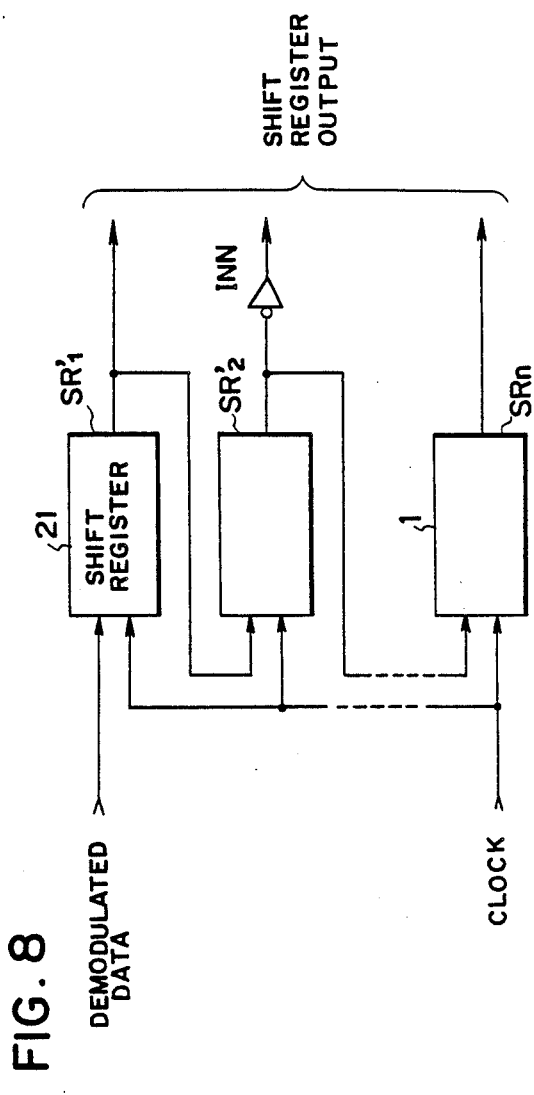
Figure 9A:
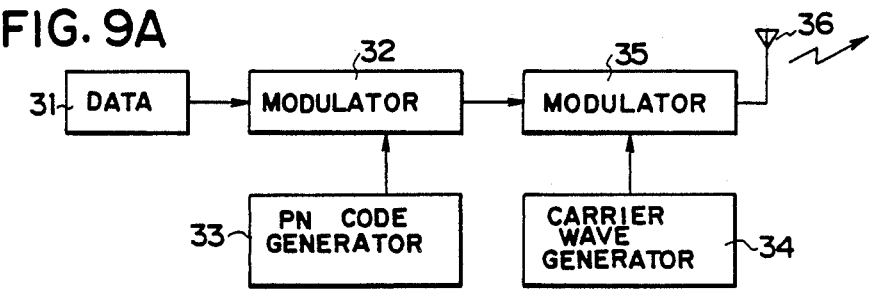
FIG. 9(a) is a block diagram illustrating the construction of a prior art spread spectrum communication transmitter.
Figure 9B:
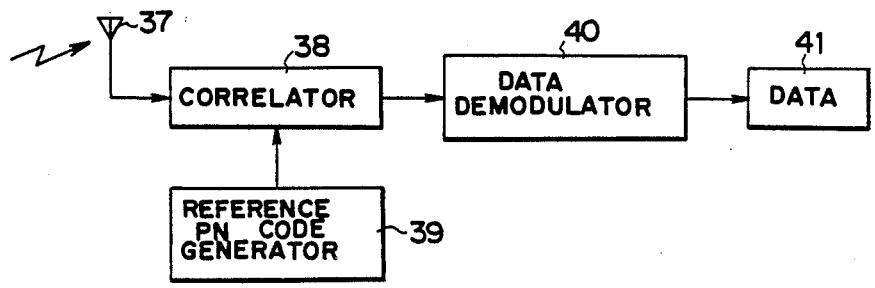
FIG. 9(b) is a block diagram illustrating the construction of a prior art spread spectrum communication receiver.
Figure 10:
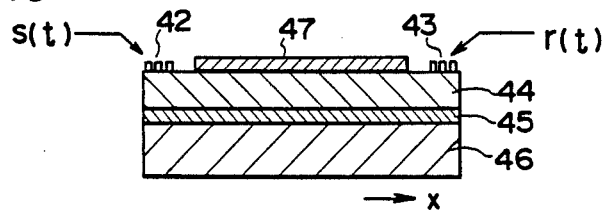
FIG. 10 is a cross-sectional view illustrating the construction of a convolver.
Figure 11A:
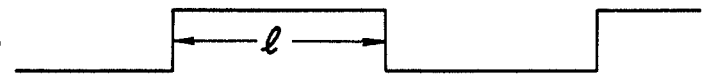
FIGS. 11(a), 11(b) and 11(c) show the relation among the arrangement of a data bit, that of a PN code and that of the gate electrode.
Figure 11B:
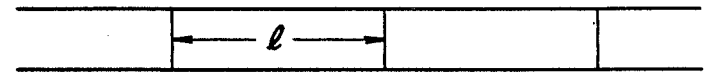
Figure 11C:
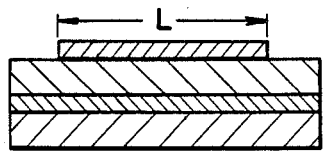

FIGS. 7 and 8 show an example of the construction of the second matched filter 10. In FIG. 7, reference numeral 21 is a shift register; 22 is a pulse counter and 23 is a comparator.

The shift register 21 consists of a plurality of shift registers $SR_1' \sim SR_2'$ connected in series with each other, as indicated in FIG. 8, Which are driven by a clock, whose period is equal to the length of one data bit, here is disposed an output terminal for every shift register.

Demodulation data are inputted in the shift register 21 and an inverter INV is connected properly with the output of every shift register so that pulses are outputted by all the shift registers $SR_1' \sim SR_2'$, when the demodulation data stated above are in accordance with the pattern set for detecting the start timing of the information data contained in the transmitted preamble data, as indicated in FIG. 13(a). The output of every shift register is inputted in the pulse counter 22.

The pulse counter 22 and the comparator 23 are constructed in tho same way as those described above. The pulse counter 22 counts the total number of the pulses outputted by the shift register 21 and converts it into binary data, which is inputted in the comparator 23. The comparator 23 compares these binary data With a threshold value set by the external circuit and outputs a pulse, when the binary data have reached the threshold value.

Now the method for setting the offset value (a) of the up-down counter 4 will be explained. The offset value stated above corresponds to the amount of delay necessary for the signal processing for generating the correlation pulse from the correlation spike.

Figure 13:
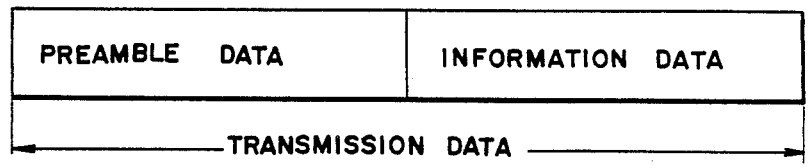
FIG. 13 shows schemes illustrating the structure of transmitted data.
Figure 13:
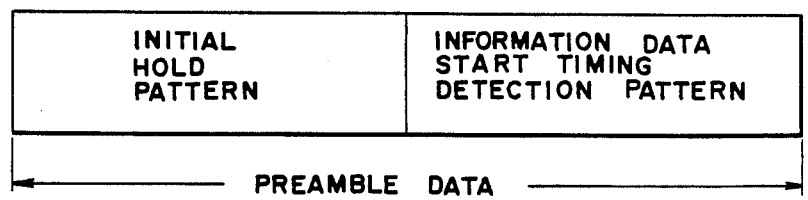
Figure 14A:
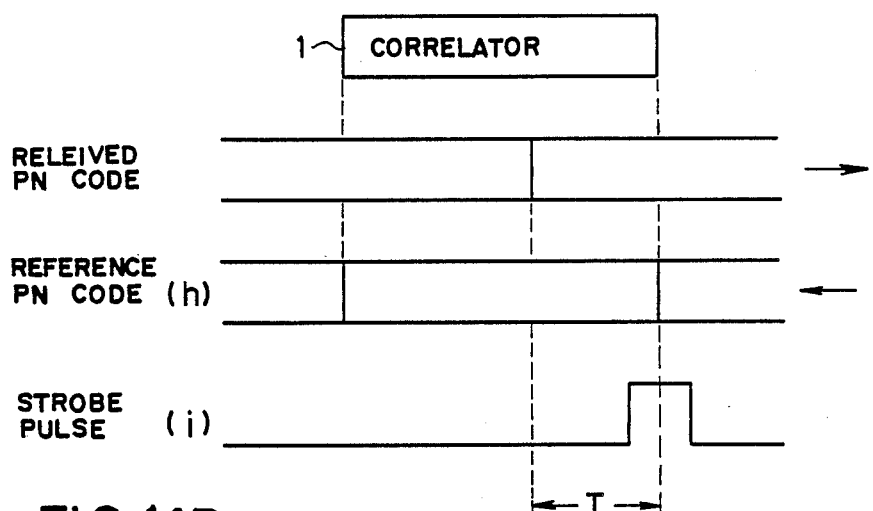
FIGS. 14(a) and 14(b) show waveforms for explaining the setting of an offset value for an up-down counter used in the embodiment described above.

For example, as indicated in FIG. 14(a), the difference in the phase between the received PN code and the reference PN code (h) in the correlator is represented by T. Then, as indicated in FIG. 13(b), it is after T/2 measured from the moment of the generation of the strobe pulse (i) indicating the front bit of the reference PN code (h) that the two codes are in accordance with each other and the correlation spike (d) is generated.

Figure 14B:
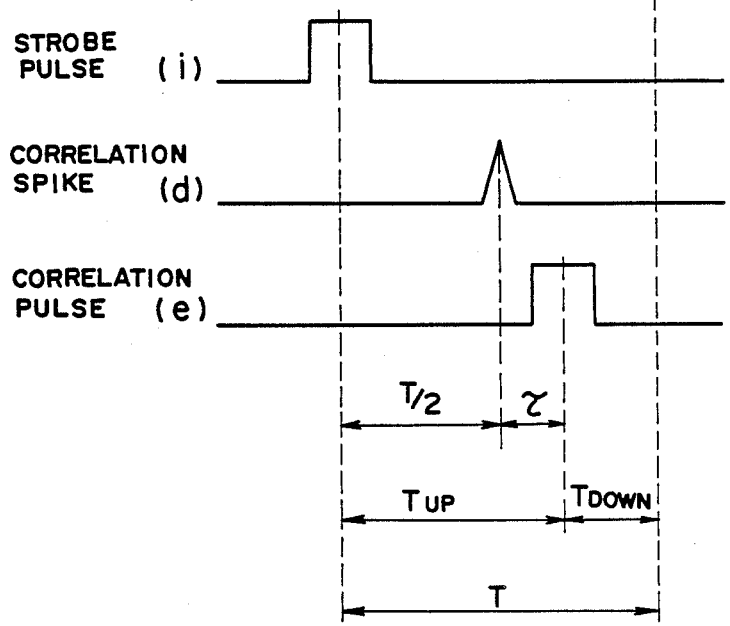

Ideally it is desirable that the up-down counter 4 is switched from the up-count to the down-count, when the correlation spike (d) is generated. However, as indicated in FIG. 14(b), since in reality the up-down counter 4 is switched over from the up-count to the down-count after the amount of delay $\tau$ necessary for the signal processing for generating the correlation pulse from the correlation spike, no normal initial synchronization can be effected.

Therefore an offset value t is set in the up-down counter 4 in order to equalize the period of time $T_{up}$, during which the up-count is effected, to the period of time $T_{down}$, during which the down-count is effected. This offset value t is given by;

$$T_{up} = \frac{T}{2} + \tau$$

$$T_{down} = \frac{T}{2} - \tau$$

$$t = T_{up} - T_{down} = 2\tau$$

When the offset value given above is set in the up-down counter 4, it is possible to effect always a stable initial synchronization.

When the initial synchronization is realized in this way, the arrangement relation between the two codes is as indicated in FIG. 12(b).

However, if there is a difference between the code clock frequencies of the two codes, the position where the two codes are in accordance with each other is shifted gradually from the arrangement relation indicated in FIG. 12(b). That is, even if the initial synchronization has been once established, if the code clock frequencies of the two codes are different, the position where the two codes are in accordance with each other is shifted gradually from the normal position.

For this reason, according to this invention measures described below are taken in order to hold the synchronization by correcting the shift describe above, i.e. the difference in the phase.

The sampling pulse and window pulse generator 6 and the digital phase lock loop circuit 7 are initialized by the phase control pulse (m) of the reference PN code (h) outputted by the PN code phase control pulse generating circuit 8.

Figure 15:
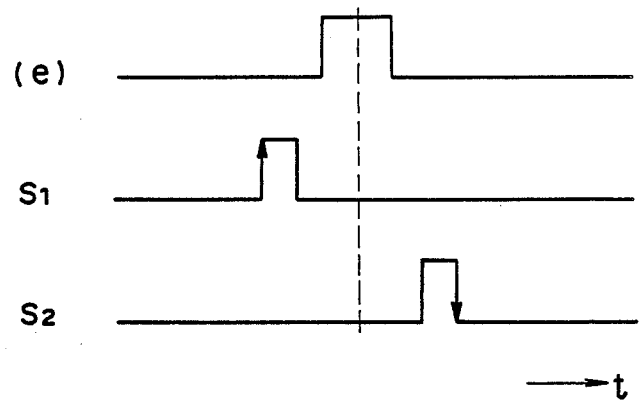
FIGS. 15 and 16 show waveforms for explaining the synchronization holding operation and the data demodulation operation, respectively, in the embodiment described above.

As indicated in FIG. 15, the circuit 6 stated above generates sampling pulses $S_1$ and $S_2$ before and after the correlation pulse (e) obtained at the correct positional relation in time, as indicated in FIG. 12(b), and outputs it to the circuit 7. The circuit 7 samples always the correlation pulse (e) by using the sampling pulses $S_1$ and $S_2$ so as to monitor the direction of the deviation of the correlation pulse.

The circuit 7 stated above counts samplings by these two sampling pulses by means of an internal counter, every time a sampling is effected, and when there is a difference between the samplings and this difference has reached a predetermined value, it outputs a pulse (l) indicating the amount of advance or delay to the circuit 8.

The circuit 8 is triggered by the pulse (l) and gives the reference PN code generator 5 the phase control pulse of the reference PN code (h) corresponding to the amount of the detected deViation of the correlation pulse obtained by using the two sampling pulses so as to control the phase. In this way errors in the phase between the two codes are corrected and the synchronization can be thus held.

It is possible to effect a demodulation of the inputted signal to obtain correct data by means of the binary data demodulation circuit 9, as described below, owing to the fact that the initial synchronization in the correlator 1 and the hold of the synchronization of the received PN code and the reference PN code can be effected as explained above.

Figure 16:
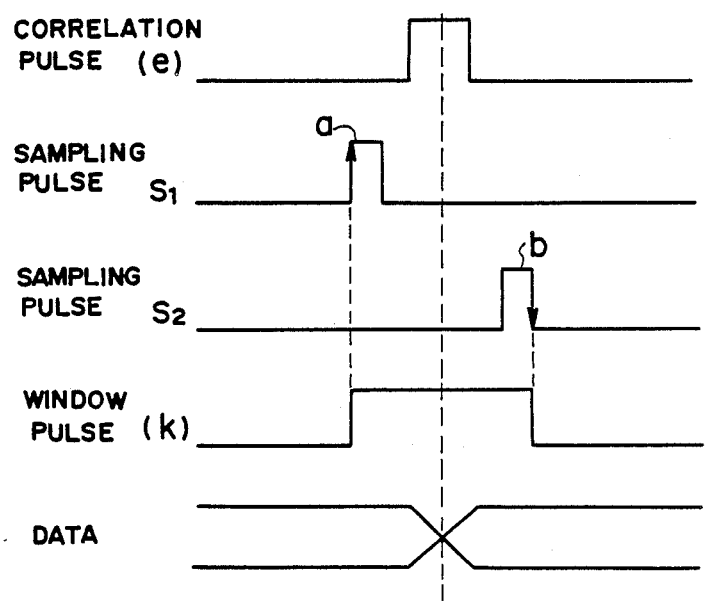
Figure 17A:
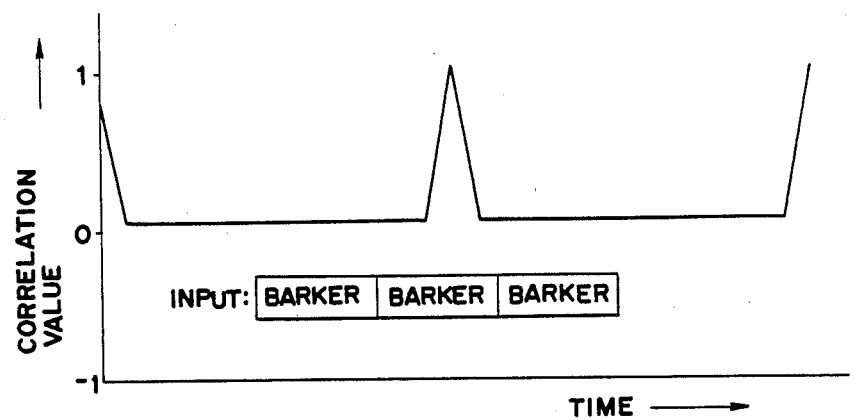
FIG. 17(a) indicates self correlation characteristics of a BARKER code.
Figure 17B:
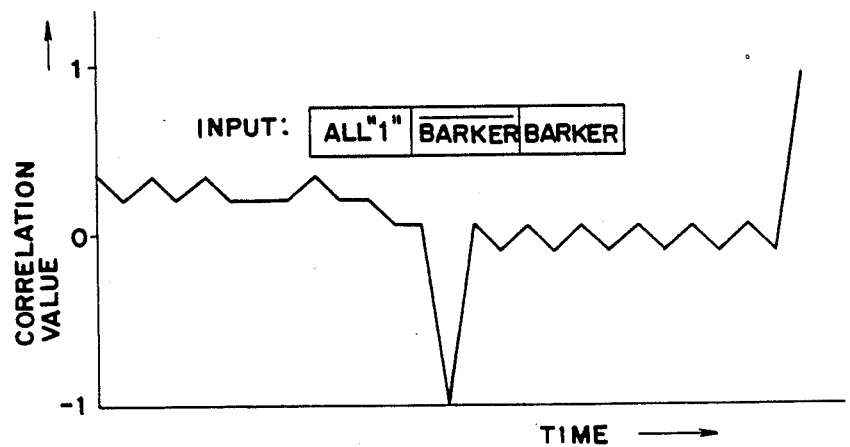
FIG. 17(b) indicates self correlation characteristics of a phase inverted BARKER code.

As indicated in FIG. 16, the positional relation between the correlation pulse (e) and tho sampling pulses $S_1$, $S_2$ is always maintained.

The sampling pulse and window pulse generator 6 generates a window pulse (k) having a width, which is equal to the distance from the rising edge of the sampling pulse $S_1$ to the falling edge of the sampling pulse $S_2$, as indicated in FIG. 13, and outputs it to the circuit 9. The circuit 9 extracts the correlation pulse (e) by using the window pulse (k) and effects a correct demodulation to obtain data.

Now, in order to treat the data obtained by the demodulation by means of the external circuit, it is necessary to detect the start timing of the information data after the establishment of the initial synchronization.

For this purpose a second pattern set for the detection of the start timing is contained in the transmitted data after the first pattern set for the initial synchronization. Further the second matched circuit 10 is weighted, corresponding to the second pattern stated above.

The data (n) obtained by the demodulation is given to the second matched circuit 10 and it is judged whether it is in accordance with the second pattern or not. When they are in accordance with each other, the second matched circuit 10 outputs a pulse (o). The external circuit can detect the start timing of the data obtained by the demodulation by using this pulse.

In this case it is specifically appropriate to use particular patterns as the first and the second patterns as described below.

That is, (a) as the first pattern a pattern, for which all the bits are "1", and as the second pattern a pattern consisting of phase-inverted BARKER codes are used, or (b) as the first pattern a pattern, for which all the bits are "0". and as the second pattern a pattern consisting of BARKER codes (not phase-inverted) are used. At the same time the first and the second matched circuits 3 and 10 are weighted, corresponding to respective patterns.

When the first particular pattern as indicated in (a) is used, the correlation spike is generated, even in the case indicated in FIG. 12(a). That is, since the correlation spike appears always with a period of ½ of the delay time corresponding to the integral domain of the correlator 1, the speed of tho operation of the initial synchronization can be increased.

When the second particular pattern as indicated in (a) is used, owing to the excellent self correlation characteristics of the BARKER code, as indicated in FIG. 13(b), even if the initial synchronization is terminated early, as stated previously, since all spurious due to the first particular pattern at that time appears on the positiVe side, it is easy to separate the detection pulse of the start timing from this spurious.

In the same way, also when the first particular pattern as indicated in (b) is used, it is possible to increase the speed of the operation of the initial synchronization and further when the second particular pattern as indicated in (b) is used, an effect similar to that described above can be obtained owing to the self correlation characteristics as indicated in FIG. 14(a).

As explained above, according to the first invention, since the initial synchronization operation is effected by using the output obtained when tho output of the correlator is in accordance with a predetermined pattern, no erroneous operations due to noises, etc. take place and a stable initial synchronization operation can be always effected. Therefore the effect for practical use is great, According to the second invention, since the offset value of the up-down counter contained in the synchronizing moans for the two PN codes in the correlator is set so as to correspond to the amount of delay, it is possible to effect always a stable initial synchronization.

According to the third invention, since the direction of deviation and the amount of deviation of the correlation pulse after the establishment of the initial synchronization of the two codes in the correlator are always monitored and the difference in the phase between the two codes is corrected, the synchronization is surely held.

According to the fourth invention, since the direction of deviation and the amount of deviation of the correlation pulse after the establishment of the initial synchronization of the two codes in the correlator are always monitored and the difference in the phase between the two codes is corrected, correct data are obtained by demodulation owing lo the fact that the synchronization is surely held.

According to the fifth and the sixth inventions, it is possible to stabilize the initial synchronization and to increase the speed thereof by using the particular patterns for detecting the initial synchronization and the start timing of the demodulated data. Further the initial synchronization is established early and it is possible to separate easily the start liming detection pulse from spurious due to the pattern of the data for effecting the initial synchronization.

The embodiments of the invention in which an exclusive property or privilege is claimed are defined as follows:

1. A spread spectrum communication receiver comprising:
   correlating means for correlating a received PN code contained in a received signal with a reference PN code contained in a reference signal;
   correlation pulse generating means for generating a series of correlation pulses, corresponding to the polarity of a correlation spike outputted by said correlating means;
   reference signal generating means for generating said reference signal;
   means for generating sampling pulses before and after said correlation pulse in time and extracting a correlation pulse from said series of correlation pulses by using those sampling pulses;
   digital phase lock means for holding the synchronization between said received PN code and said reference PN code;
   phase control means for controlling the phase of said reference PN code, responding to the output of said digital phase lock means; and
   data demodulation means for demodulating said received signal to obtain data by extracting a correlation pulse from said series of correlation pulses by using a window pulse having a time interval between said sampling pulses generated before and after said correlation pulse in time.

2. A spread spectrum communication receiver comprising:
   reference PN code generator means for generating a reference PN code;
   convolver means for correlating a received PN code contained in a received signal with said reference PN code to generate a correlation spike;
   correlation pulse generator means for generating a series of correlation pulses corresponding to the polarity of said correlation spike from said convolver means and having a pattern;
   detecting means for detecting coincidence between said pattern of said series of correlation pulses and a predetermined pattern, and for producing a detection signal upon detection of said coincidence;
   an up/down counter supplied with a start signal indicative of the start of said reference PN code and supplied with said detection signal from said detecting means, said counter starting counting in one of up and down directions in response to receipt of said start signal, changing the counting direction with respect to an obtained count value in response to receipt of said detection signal, and producing an output pulse when the count value reaches a predetermined value; and
   phase control means responsive to said output pulse of said counter for producing a control signal for controlling the phase of said reference PN code.

3. The spread spectrum communication receiver according to claim 2, wherein said up/down counter is initialized with an offset count value which is a function of a delay time from said correlation spike to a point in time at which said detecting means detects said coincidence, and wherein said counting in response to said start signal starts from said offset count value.

4. The spread spectrum communication receiver according to claim 2, wherein said code generator means includes means for generating said start signal, and includes means responsive to said control signal from said phase control means for controlling the phase of said reference PN code.

5. A spread spectrum communication receiver comprising:
   reference PN code generator means for generating a reference PN code;
   convolver means for correlating a received PN code contained in a received signal with said reference PN code to generate a correlation spike;
   correlation pulse generator means for generating a series of correlation pulses corresponding to the polarity of said correlation spike from said convolver means;
   means for generating an early sampling pulse prior to and a later sampling pulse after a point in time at which a correlation pulse should be generated by said pulse generator means when the received PN code has a predetermined relationship with respect to said reference PN code;
   detecting means supplied with said series of correlation pulses and responsive to said sampling pulses for detecting a time deviation from said point in time of a correlation pulse generated by said pulse generating means; and
   phase control means responsive to detection of said time deviated correlation pulse for generating a phase control signal to control the phase of said reference PN code.

6. The spread spectrum communication receiver according to claim 5, wherein said means for detecting a time deviated correlation pulse includes a counter for counting the number of correlation pulses sampled in response to a plurality of said early sampling pulses as a result of a time deviation representing a time advance and for counting the number of correlation pulses sampled in response to a plurality of said later sampling pulses as a result of a time deviation representing a time delay, said counter generating a deviation signal indicative of the amount of advance or delay time deviation based on its count value and supplying said deviation signal to said phase control means, said phase control means generating said phase control signal in response to said deviation signal.

7. The spread spectrum communication receiver according to claim 5, wherein said code generator means is responsive to said phase control signal for controlling the phase of said reference PN code.

8. A spread spectrum communication receiver, comprising:
reference PN code generator means for generating a reference PN code;
convolver means for correlating a received PN code contained in a received signal with said reference PN code to produce a correlation spike;
correlation pulse generator means for generating a series of correlation pulses corresponding to the polarity of said correlation spike from said convolver means;
means for generating an early sampling pulse prior to and a later sampling pulse after a point in time at which a correlation pulse should be generated by said pulse generator means when the received PN code has a predetermined relationship with respect to said reference PN code;
window pulse means for generating a window pulse based on said sampling pulses and having a predetermined time width; and
data demodulating means responsive to said window pulse for extracting a correlation pulse from said series of correlation pulses and demodulating data therefrom.

9. The spread spectrum communication receiver according to claim 8, wherein said window pulse begins when said early sampling pulse begins and terminates when said later sampling pulse terminates.

10. The spread spectrum communication receiver according to claim 8, including matching means for detecting a relative match between said demodulated data and a predetermined pattern in order to detect the start timing of information data present in said demodulated data and to produce a detection output for an exterior circuit, said matching means being weighted according to said predetermined pattern.

11. A spread spectrum communication receiver comprising:
reference PN code generator means for generating a reference PN code;
convolver means for correlating a received PN code contained in a received signal with said reference PN code to produce a correlation spike;
correlation pulse generator means for generating a series of correlation pulses corresponding to the polarity of said correlation spike from said convolver means and having a pattern;
first detecting means for detecting coincidence between the pattern of said series of correlation pulses and a pattern whose bits are all "1" or "0" and for producing a detection output in response to detection of said coincidence;
initial synchronizing means responsive to said detection output for controlling the phase of said reference PN code to establish initial synchronization between said received and reference PN codes;
data demodulating means for extracting a desired pulse from said series of correlation pulses and for demodulating data therefrom; and
second detecting means for detecting coincidence between said demodulated data and one of a predetermined Barker code and its phase-inverted pattern and for producing a detecting signal representing the start timing of information data contained in said demodulated data.

* * * * *